United States Patent
VanderLans et al.

(10) Patent No.: US 10,533,694 B1
(45) Date of Patent: Jan. 14, 2020

(54) BYPASS BRIDGE FOR FLUID LINES

(71) Applicant: Vanderlans & Sons, Inc., Lodi, CA (US)

(72) Inventors: Eric G. VanderLans, Lodi, CA (US); Nicholas A. Bettencourt, Lodi, CA (US)

(73) Assignee: Vanderlans & Sons, Inc., Lodi, CA (US)

( * ) Notice: Subject to any disclaimer, the term of this patent is extended or adjusted under 35 U.S.C. 154(b) by 24 days.

(21) Appl. No.: 15/864,251

(22) Filed: Jan. 8, 2018

Related U.S. Application Data

(60) Provisional application No. 62/443,437, filed on Jan. 6, 2017.

(51) Int. Cl.
*F16L 55/16* (2006.01)
*F16L 55/162* (2006.01)
*E03F 7/00* (2006.01)

(52) U.S. Cl.
CPC ........... *F16L 55/1604* (2013.01); *E03F 7/00* (2013.01); *F16L 55/162* (2013.01); *F16L 55/1612* (2013.01)

(58) Field of Classification Search
CPC . F16L 55/1604; F16L 55/1612; F16L 55/162; F16L 55/134; Y10T 137/87265
USPC .................................................. 138/93, 97
See application file for complete search history.

(56) References Cited

U.S. PATENT DOCUMENTS

| | | | | | |
|---|---|---|---|---|---|
| 1,221,733 | A | * | 4/1917 | Henderson | G01M 3/022 138/90 |
| 3,618,639 | A | * | 11/1971 | Daley | E21B 33/1243 138/93 |
| 3,834,422 | A | * | 9/1974 | Larson | F16L 55/16455 138/93 |
| 3,946,761 | A | * | 3/1976 | Thompson | F16L 55/16455 138/98 |
| 4,627,471 | A | * | 12/1986 | Parkes | F16L 55/16455 138/97 |
| 4,646,787 | A | * | 3/1987 | Rush | G01M 3/005 104/138.2 |
| 6,959,734 | B2 | * | 11/2005 | Lundman | F16L 55/134 137/240 |
| 2004/0003855 | A1 | * | 1/2004 | Dees | F16L 55/1283 138/93 |

* cited by examiner

*Primary Examiner* — Patrick F Brinson
(74) *Attorney, Agent, or Firm* — Heisler & Associates

(57) ABSTRACT

A sleeve is provided with an upstream end a downstream end each fitted with inflatable bladders. Rigid rings are provided inboard of these inflatable bladders to keep the sleeve open when the bladders are expanded against a surface of a fluid transport line. The ends of the sleeve preferably include cuffs thereon with the rings residing within these cuffs. Spreader bars can be provided between the rings at the upstream and downstream ends of the sleeves, to keep the sleeve in an elongated form. Sleeve support trolleys can be provided for supporting the sleeve and resisting sagging thereof at points between ends of the sleeve. Portions of the rings and sleeve support trolley can be collapsible to facilitate placement through limited size entry ports into the fluid transport line. Flow thus continues through the sleeve while maintenance is done on portions of the fluid line adjacent to the sleeve.

18 Claims, 5 Drawing Sheets

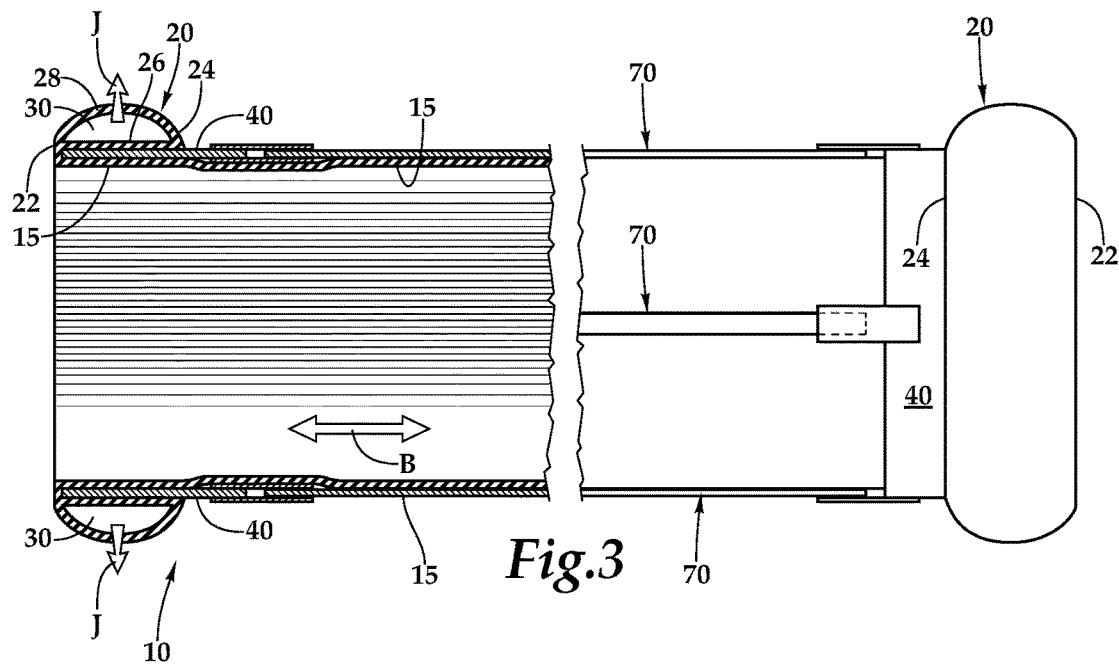
Fig.3
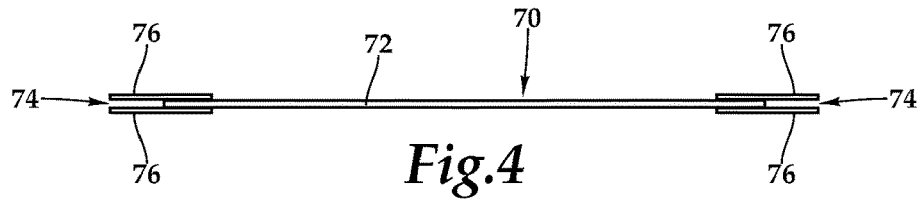
Fig.4
Fig.5
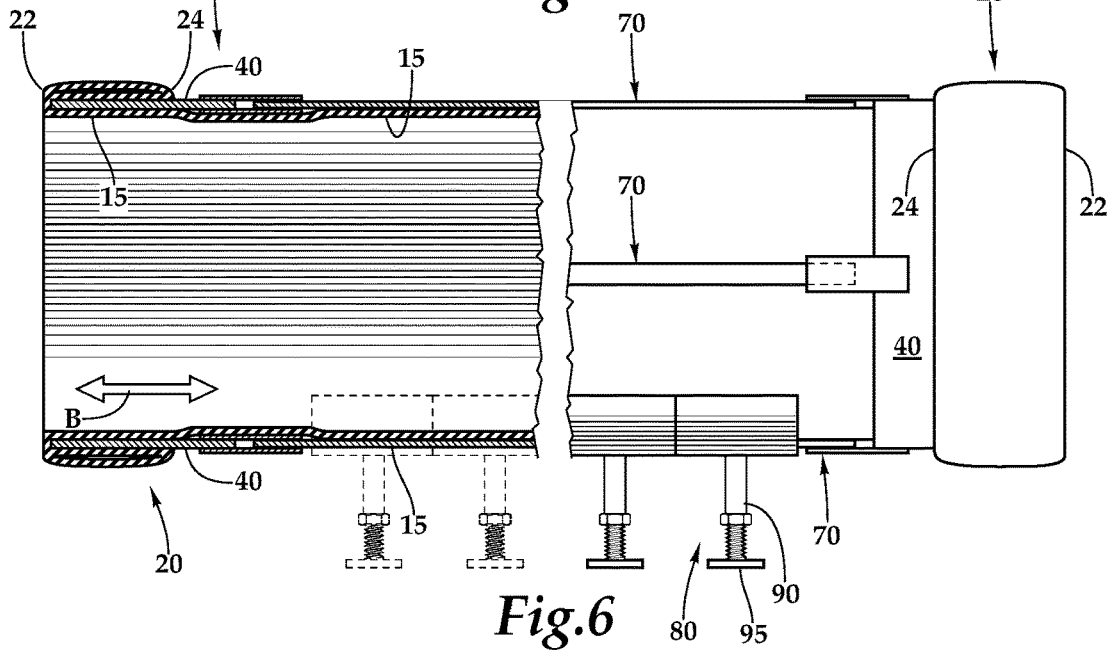
Fig.6

BYPASS BRIDGE FOR FLUID LINES

CROSS-REFERENCE TO RELATED APPLICATIONS

This application claims benefit under Title 35, United States Code § 119(e) of U.S. Provisional Application No. 62/443,437 filed on Jan. 6, 2017.

FIELD OF THE INVENTION

The following invention relates to sewer plugs, and especially bypass plug type sewer plugs. More particularly, this invention relates to bypass sewer plugs for use in sewer lines and other fluid transport lines which include sleeves associated therewith for routing of fluids therethrough, and isolating of fluids from walls of the sewer system or other fluid lines, so that these walls and other surfaces can be accessed, such as for maintenance.

BACKGROUND OF THE INVENTION

When doing manhole rehabilitation or other sewer or other fluid line maintenance, or when otherwise required to bypass flow through a section of pipe or other conduit, and especially large diameter underground piping systems, such as sewer systems, challenges can be encountered when relatively large flow must be maintained during the operation which requires the bypass of the fluid. A standard prior art technique is to utilize a bypass plug and a pump. A bypass plug is inserted into the fluid line upstream of the work area to be bypassed. A flexible tube downstream of this bypass plug is routed up to a surface and out of the pipeline (or otherwise out of the flow pathway which is to be worked upon). Typically, a pump is required to lift the fluid to this lateral position outside of the area to be worked upon. A second conduit will then run downstream to an area safely past the work area and then routed back into the fluid pathway.

This typical prior art solution has numerous drawbacks. Existing bypass plugs have a significantly smaller inside diameter than the pipe in which they are fitted, so that only small flows can be accommodated. Bypass plugs big enough to handle the flow will not fit through the standard twenty-four inch (or even the thirty-six inch) manhole opening. Furthermore, the complexity of setting up and operating the pump is required. Also, the conduits on the surface often produce ancillary problems, such as inhibiting the flow of traffic over streets, when the fluid pathway being worked on is a sewer system (or other fluid lines) located beneath streets.

In some instances it is effective to utilize a pipe plug to completely stop flow. The fluid handling system is merely allowed to back up behind this plug while the work is performed. After the work is completed, the plug is removed and flow recommences. Such a solution is only effective when the work can be done sufficiently rapidly and/or where the flow rates are sufficiently low that backing up of fluids within the pipe does not result in any undesirable effects. This is not the case in many instances.

Accordingly, a need exists for further bypass options, and especially options which can avoid the drawbacks presented in the prior art. In particular, a need exists for bypass systems and methods which can handle large flow rates and fit through a standard manhole opening, and which can avoid routing onto the surface, while still effectively bypassing the work area so that work can be effectively performed. Such systems are desirable that also benefit from being easy to install and remove, and being configured to reliably maintain position and operate effectively, so that work can be safely and efficiently performed on the fluid line while the bypass is in place.

SUMMARY OF THE INVENTION

With this invention, a bypass bridge is provided which includes bypass plugs at upstream and (typically also) downstream ends thereof and provides a continuous conduit between these bypass plugs which maintains a large portion of the diameter of the conduit in which the bypass plug is installed. For instance, this invention maintains a diameter as large as six inches less than the diameter of the conduit in which the bypass bridge is installed (e.g. if a thirty-six inch diameter conduit is involved, a thirty inch bypass bridge is installed to handle flow therethrough). The product can be used according to a method where fluid is not circuitously routed out of the fluid transport line and then back into the line, but rather remains within the line in which the bypass bridge is installed. Walls of the fluid transport line and junctions into and out of the line can be worked upon while the bypass bridge is in place.

In one form of the invention, the bypass bridge has a pair of cuffs at upstream and downstream ends thereof. These cuffs are preferably formed of rubber tube material which is doubled back upon itself at the ends. Metal rings are provided, which are sized to fit within each of these cuffs. The cuffs can be continuous with a fluid transport sleeve therebetween or separate and attached to the intermediate sleeve.

Each metal ring is preferably formed as a split ring body which can collapse to a smaller size and then be configured into a larger size. In one embodiment, each ring has first and second parts hinged together and third and fourth parts hinged together, with the first and second parts removably attachable to the third and fourth parts. The hinges allow collapsing inwardly, but prevent collapsing outwardly beyond a hemi-circular form. Such collapsing and reconstructing of the ring body can facilitate its passage through smaller openings than a diameter of the ring, such as (for instance) to allow a thirty inch diameter ring for a thirty inch diameter bypass to be usable in a thirty-six inch diameter conduit, and to pass through a standard twenty-four inch manhole. The ring provides rigidity at each of the ends of the bypass bridge.

An outer surface of each cuff is provided with an inflatable bladder. To make this bladder inflatable, it will typically have a valve structure to which an air pump or other fluid pump can be connected and pressurized fluid can be passed into this bladder for inflation thereof. When the bladder is inflated, the bladder will come into contact with walls of the conduit, pressing against the walls of the conduit and forming a tight seal. The ring body is inserted within the cuff before inflation of the bladder. Thus, air inflating the bladder pushes outward on the conduit in which the end of the bypass bridge is installed, with this bladder pushing against the ring, and the ring preventing inward radial expansion of the bladder during inflation. A secure seal is thus provided with side walls of the conduit and also a friction fit is provided to resist lateral slippage of the bypass bridge after the bladder has been inflated. Similar bladders are provided at each end as well as similar cuffs and similar rings, so that both the upstream end and downstream end of the bypass bridge are similar in form, in a preferred embodiment. The bypass bridge is thus reversible and an operator need not be concerned about which end is an upstream end and which end is a downstream end.

To ensure that the bypass bridge maintains its length between the upstream and downstream ends, and also to keep the bypass bridge generally linear, spreader bars are preferably provided which removably attach to each of the rings adjacent to each of the ends of the bypass bridge. In one embodiment, these rigid bars are in the form of round pipe stock and fit removably with connectors attached to the rings. The two cuffs at upstream and downstream ends of the bypass bridge are thus kept at a desired spacing between each other and oriented with a central axis of the cuffs aligned with a central axis of the conduit in which the bypass bridge is installed.

The sleeve between the upstream and downstream ends can be any form of flexible (or potentially rigid but would need to fit through the manhole opening) tube or pipe sections. In a simple embodiment, a flexible rubber tube acts as the sleeve joining the upstream and downstream ends and accommodates flow between the upstream and downstream ends. When a flexible tube is provided, to keep this sleeve from sagging between the ends, a sleeve support trolley (or multiple trolleys) can be provided. This sleeve support trolley has separate sections which can include hinge flaps which can be optionally deployed to support at least a fourth of a circumference of the sleeve (and optionally a third or even a half of this sleeve).

This sleeve support trolley, in one embodiment, is supported from below with a leg which rests upon an underlying floor surface. Such legs can be adjustable in height, such as with a telescoping joint of some sort (e.g. a threaded telescoping arrangement which allows rotation to adjust length of the legs). As a further option, eyelets or other connectors could be provided on ends of the sleeve support trolley which would allow for the sleeve support trolley to be suspended from above, such as with cables, ropes, etc.

Such support/suspension can keep the sleeve optimally positioned between the upstream and downstream ends so that work adjacent to the sleeve can be effectively performed without the sleeve abutting walls of structures to be replaced, rehabilitated or otherwise worked upon. If the conduit being worked upon has a curving character, these legs, suspension elements, etc. can be utilized to cause the sleeve to curve in a desired fashion between the upstream and downstream ends. The sleeve support trolley has the hinged flaps on ends thereof to facilitate passage of the sleeve support trolley through a manhole or other access portal. A number of sleeve support trolleys utilized can vary depending on the length of the sleeve and the amount of support desired.

One method of use is facilitated which keeps the bypass route for fluids away from the surface so that fluid traffic is not impacted. Furthermore, a large diameter of flow through the conduit is maintained even though the surfaces of the conduit are completely exposed so that work can be done upon these surfaces. Lengths and diameters of the various different components of the bypass bridge could be adjusted to accommodate fluid lines of different sizes. Furthermore, if shapes other than circular cross-section shapes are involved within a fluid line, a bypass bridge can be appropriately modified to have a matching geometry. While a preferred embodiment of the invention includes all of the elements disclosed herein, certain versions of the invention could be provided which would operate effectively without the sleeve support trolley or which could operate effectively without the spreaders between the two rings.

In embodiments where junctions are provided in fluid handling lines, such as a Tee, and the line is being worked upon, a variation of the bypass bridge could be provided where a Tee sleeve of flexible material would be provided between three upstream or downstream cuffs and associated inflatable bladders. In this way, junctions within lines could similarly be bypassed. One upstream and two downstream ends would each include cuffs thereon, or two upstream and one downstream ends would have cuffs thereon. In a similar manner, a four-way "cross" could similarly be accommodated with a cross shaped sleeve and with the four ends each including a cuff thereon which can be inflated with a bladder for installation and bypassing of a four-way junction.

In sections of fluid handling lines where sizes of the line are changing, a sleeve could be provided which has larger and smaller diameter portions to match the line and provide appropriate bypass effectiveness. As an example, a Tee might be provided with a twenty-four inch upstream diameter and two eighteen inch downstream diameters. A sleeve having an eighteen inch upstream portion and two twelve inch downstream portions could be provided with an eighteen inch cuff at the upstream end of the sleeve and two twelve inch cuffs at the two downstream ends of the sleeve. Appropriate numbers of sleeve support trolleys could be deployed with such multi-ended bridges to support these sleeves as required between the various cuffs.

OBJECTS OF THE INVENTION

Accordingly, a primary object of the present invention is to provide a bypass bridge which can be installed within a fluid line such as a sewer line, to allow for maintenance of the line.

Another object of the present invention is to facilitate underground fluid transport line maintenance without requiring any routing of fluids above a surface.

Another object of the present invention is to provide a bypass bridge which allows fluids to be bypassed within a fluid transport line isolated from walls of the fluid transport line, but within the fluid transport line, for access of walls of the fluid transport line, such as for maintenance.

Another object of the present invention is to provide a method for simplifying maintenance of underground fluid transport lines which require flow to not be corrupted.

Another object of the present invention is to provide a bypass bridge within a sewer line or other fluid transport line which is easy to install and remove.

Another object of the present invention is to provide a bypass bridge which, once installed, maintains its length.

Another object of the present invention is to provide a method and apparatus for bypassing a junction in a fluid transport line without requiring flow routing above a surface and while maintaining a large percentage of flow through the line.

Another object of the present invention is to provide a bypass bridge which can fit through a small manhole cover or other access point and then be enlarged to a larger size.

Other further objects of the present invention will become apparent from a careful reading of the included drawing figures, the claims and detailed description of the invention.

BRIEF DESCRIPTION OF THE DRAWINGS

FIG. 3 is a partial sectional elevation view of the bypass bridge assembly of FIG. 2, with bladders at ends thereof inflated and with spreader bars associated therewith. The left end is shown in section and the right end is not shown in section, and the two ends are similar in form to facilitate use extending in either direction.

FIG. 4 is a top plan view of a spreader bar also partially depicted in FIG. 3, for keeping ends of the bypass bridge spaced from each other.

FIG. 5 is a front elevation view of that which is shown in FIG. 4.

FIG. 6 is a partial sectional front elevation view of that which is shown in FIG. 3, but with bladders at the ends of the bypass bridge assembly shown deflated.

DESCRIPTION OF THE PREFERRED EMBODIMENT

Figure 1:
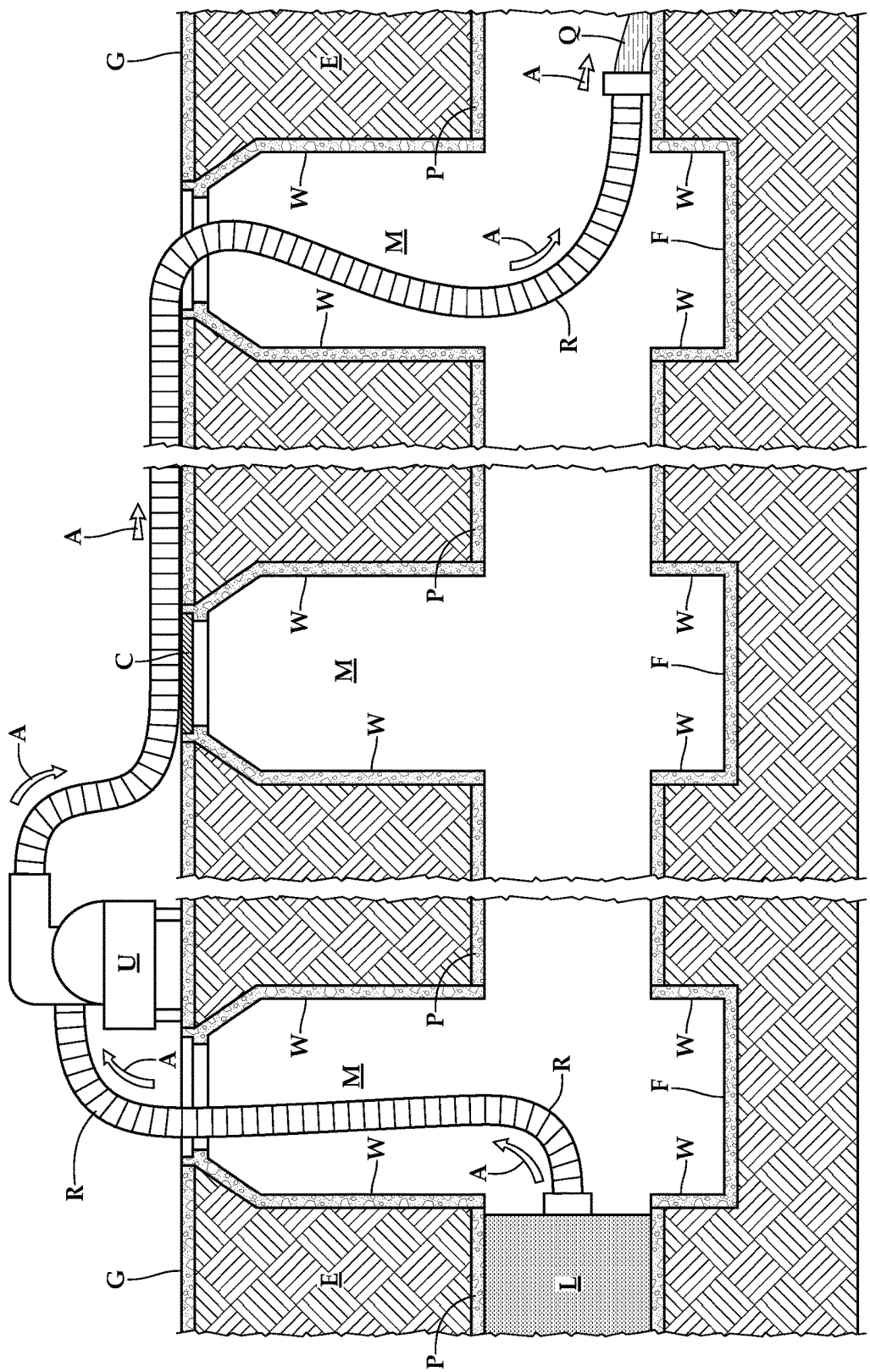
FIG. 1 is an elevation sectional view of an underground sewer system utilizing a prior art bypass methodology involving pumping fluids out of an upstream portion of the sewer pipe and then routing the fluid on the surface of the ground to a downstream location where it can return into the underground pipe, for bypassing an intermediate maintenance location according to the prior art.

Referring to the drawings, wherein like reference numerals represent like parts throughout the various drawing figures, reference numeral 10 is directed to a bridge assembly (FIG. 2) which acts as a bypass bridge past a maintenance area within a fluid transport line, such as a pipe P (FIG. 1) and in particular typically a pipe P buried in earth E under ground G, such as at or adjacent to a manhole M. The bypass assembly 10 (FIG. 2) avoids requiring bypass elements located above ground G (FIG. 1), to avoid problems such as blocking roads when sections of a fluid transport pipe P require repair, inspection or other maintenance.

Figure 2:
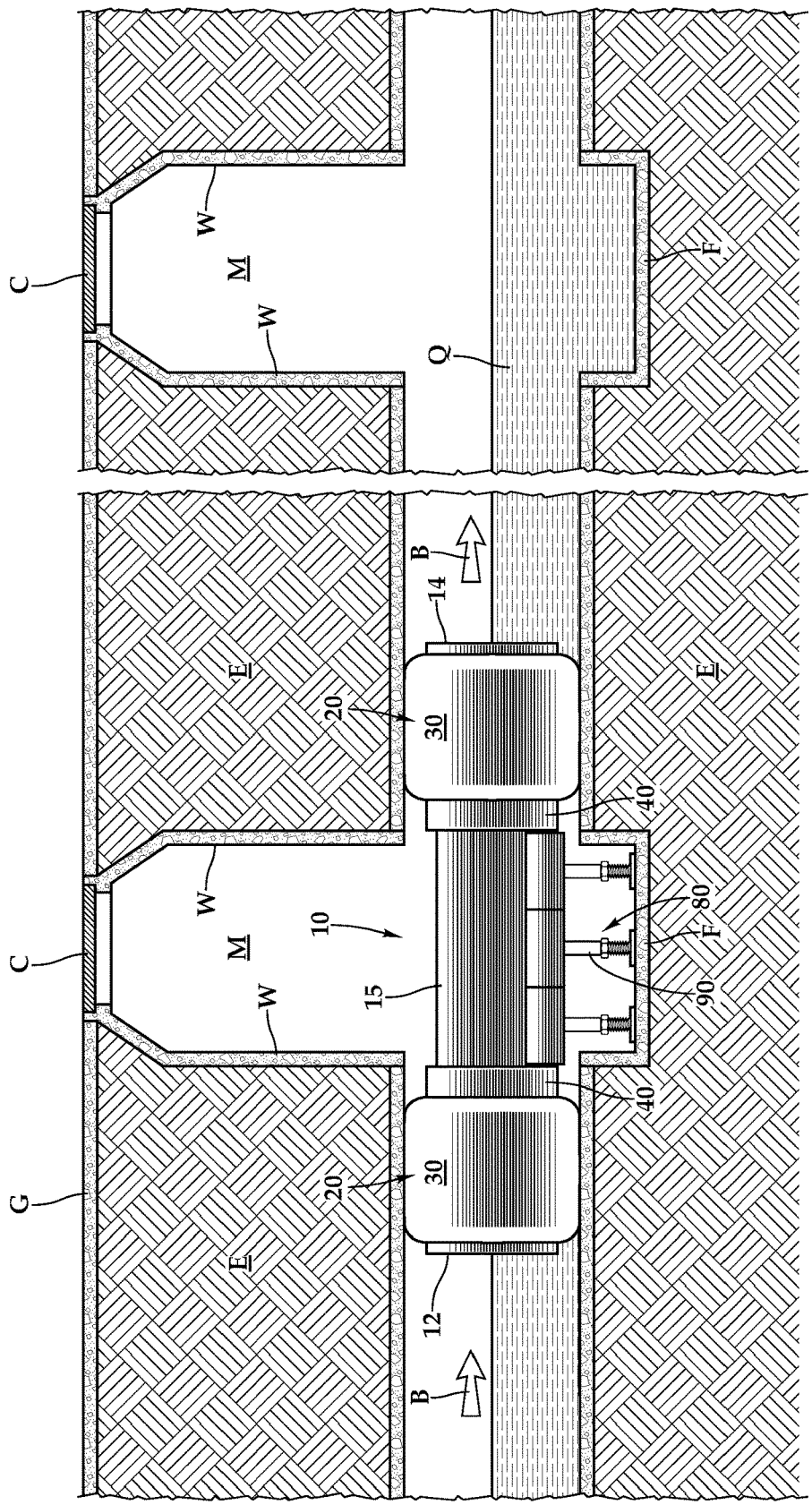
FIG. 2 is an elevation sectional view of an underground sewer pipe utilizing the bypass bridge according to one embodiment of this invention, to facilitate maintenance at or adjacent to a manhole according to a method of this invention.
Figures 7, 8, 9:
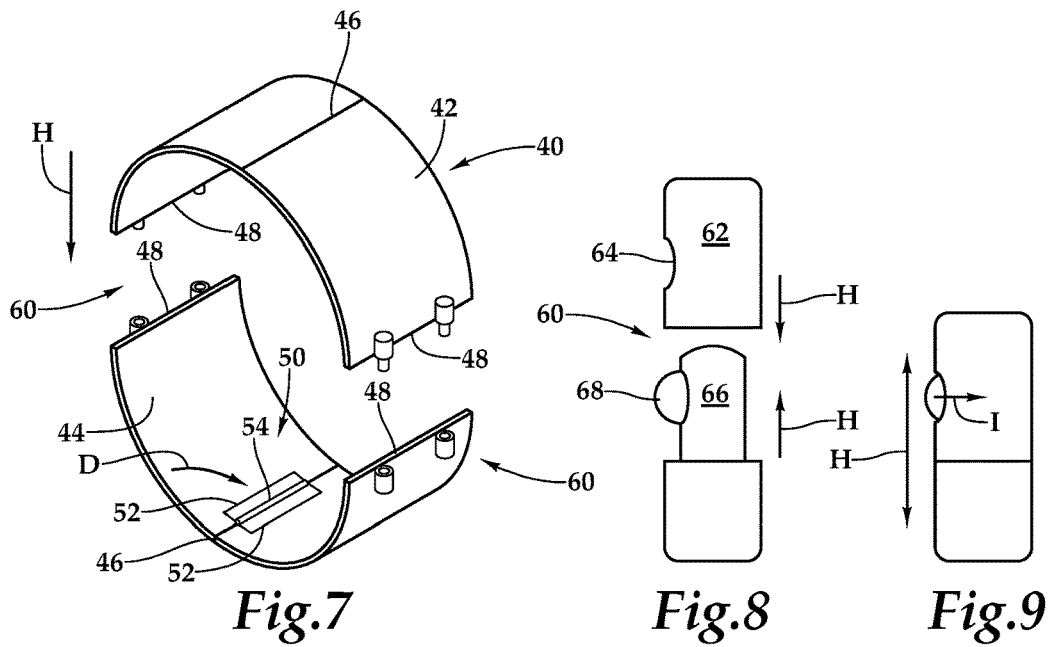
FIG. 7 is a perspective view of a collapsible split ring assembly according to one embodiment of this invention with the rigid ring broken into two halves which can each be collapsed and assembled together to form a complete rigid ring which can fit within cuffs adjacent to ends of the sleeve of the bypass bridge assembly, such as that depicted in FIGS. 3 and 6.
FIG. 8 is a front elevation view of a clasp assembly provided at edges of the halves of the ring of FIG. 7, with the clasp shown with bore sleeve and post portions thereof spaced apart.
FIG. 9 is a front elevation view of that which is shown in FIG. 8, but with the bore sleeve and post connected together.

In essence, and with particular reference to FIG. 2, basic details of the bypass bridge assembly 10 are described, according to a preferred embodiment. The bridge assembly 10 includes a pair of cuffs 20 at an entry end 12 upstream of an exit end 14. These cuffs 20 are preferably reversible and each include a bladder 30. Rigid rings 40 fit within these cuffs 20 and provide a reference surface against which the bladder 30 can press, keeping a central conduit/sleeve 15 of the bridge assembly 10 open while the bladder 30 engages surfaces of the pipe P upstream and downstream of a maintenance area. This ring 40 is preferably collapsible, such as by forming it in two halves which can each collapse about hinges 50, and which halves are connected together through clasp subassemblies 60 (FIG. 7). Spreader bars 70 (FIGS. 3-6) are also preferably provided extending between the rings 40 to maintain an overall length of the bridge assembly 10.

Figure 10:
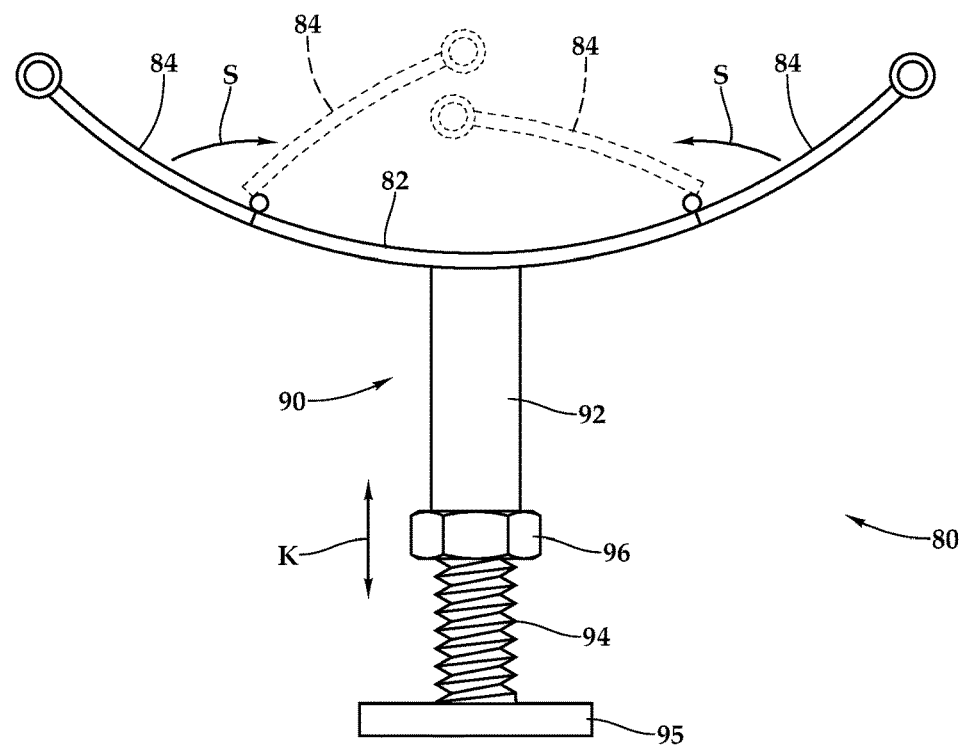
FIG. 10 is a side elevation view of a sleeve support trolley which provides for sleeve support at intermediate portions thereof, and as also depicted in FIG. 2, and which in this embodiment is adjustable in height and collapsible, such as for fitting through a manhole cover opening or other small access point, and with height adjustability for optimal sleeve support.

A sleeve support trolley 80 (or set of trolleys 80) are provided under the sleeve 15 to resist sagging of the sleeve 15 when transporting fluids and tending to flex downward under gravity loads (FIGS. 2, 6 and 10). The sleeve support trolleys 80 are preferably foldable, such as to fit through manhole M cover C openings and preferably include a leg 90 extending downward therefrom to a foot 95, with the leg 90 adjustable in height to optimize height of the sleeve support trolley 80. With an alternative bridge assembly 110 (FIGS. 11-13), a bladder 130 is expanded from a fixed ring 140 which is typically not collapsible and located adjacent to upstream and downstream ends of a flexible sleeve 115. An alternative support trolley 180 has an adjustable leg 190 extending up from a foot 195, but without the alternative trolley 180 folding in this embodiment.

More specifically, and with particular reference to FIG. 1, details of a typical prior art bypass arrangement are described. In such a prior art system and a method, a pipe P to be inspected, repaired or otherwise maintained has a plug L fitted into the pipe P upstream of a repair area, and typically adjacent to a manhole M. A bypass sleeve R accesses flow passing through this plug L, routing this flow (along arrow A) to a pump U above ground G, and then continuing along sleeve R and following arrow A above ground G until it has fully bypassed a maintenance area and returns underground through a downstream manhole M and where the liquid Q is discharged at a downstream location. Such a prior art arrangement is complex to install, requires that a pump U operate reliably, and requires extensive sleeve R routing above ground G, which can block traffic and cause other complications.

With continuing reference to FIGS. 2, 3 and 6, details of the bridge assembly 10 according to a preferred embodiment of this invention are described. The bridge assembly 10 extends from an entry end 12 located at an upstream location to an exit end 14 located at a downstream location. A conduit/sleeve 15 extends between these ends 12, 14. This sleeve 15 is typically formed of a rubber material, but has sufficient wall thickness and chemical constitution that it is only partially flexible. Greater flexibility could be provided for this sleeve 15 if desired, such as to accommodate curves in the pipe P. It is also conceivable that the sleeve 15 could be rigid, either formed from rubber materials or metal, composites, plastics, or other materials.

Each end of the sleeve 15 preferably doubles back upon itself to form a cuff 20. Preferably each end 12, 14 includes such a cuff 20, and preferably the bridge assembly 10 is symmetrical about a middle thereof, so that the cuffs 20 can swap locations interchangeably, with one cuff 20 at the entry end 12 and one cuff 20 at the exit end 14 for the sleeve 15.

To form this cuff 20, a fold 22 is provided at an extreme distal end of the sleeve 15, before the cuff 20 doubles back upon itself and terminates at a return lip 24 which has returned some distance back away from the fold 22 and toward the middle of the sleeve 15 length. With such a configuration of the cuff 20, it includes a pair of walls returning from the fold 22 to the return lip 24, including an inner wall 26 inboard of an outer wall 28 which are generally concentric about a centerline of the sleeve 15. A space between these walls 26, 28 defines a bladder 30. This bladder 30 is fillable so that it can expand radially outwardly and engage a surface of a pipe P to be maintained, typically at a location both upstream and downstream of a particular area requiring maintenance. In one embodiment, filling of the bladder 30 involves constructing the cuff 20 at each end to include a valve and valve stem structure, for instance a Schrader valve such as that which is provided on a typical automobile tire. Compressed air can be provided through this valve and passed into the bladder 30 for filling thereof.

A ring 40 (FIG. 7) is preferably provided adjacent to the cuff 20 which is rigid in form and against which the bladder 30 can press as it expands, so that the bladder 30 does not extend inwardly when inflated, but rather only extends outwardly to engage the surface of the pipe P adjacent to the entry end 12 and exit end 14 of the bridge assembly 10. This ring 40 fits inboard of the inner wall 26 and outboard of the entry end 12 and exit end 14 of the sleeve 15 forming the bridge assembly 10. This ring 40 access space within each cuff 20 can be accessed adjacent to and under the return lip 24 on each cuff 20. In particular, the ring 40 can be located outboard of the sleeve 15 and spaced somewhat away from one of the cuffs 20, and then be slid under the return lip 24 and toward the fold 22 of the cuff 20 to fit into this space inboard of the inner wall 26 of the cuff 20 and inboard of the bladder 30. The cuff 20 could be formed in other configurations, such as with a ring 40 access space accessed from an opening beyond the entry end 12 and/or exit end 14, or the ring 40 could be permanently encased within such an access space within the cuff 20.

The ring 40 is preferably collapsible in form and able to be broken down into a first half 42 and a second half 44 which are connectible together so that the ring 40 can be placed upon the sleeve 15 before being slid into the cuff 20 inboard of the inner wall 26 of the bladder 30. Each half 42, 44 is a semi-cylindrical structure which, when combined together, forms a cylindrical ring. Each of these halves 42, 44 preferably includes a mid seam 46 at the center thereof and edges 48 at extreme ends thereof. This mid seam 46 preferably has a hinge 50 located thereon.

The hinge 50 has a pair of plates 52 with a pintle 54 therebetween, facilitating pivoting of the plates 52 relative to each other and pivoting of each of the halves 42, 44 about the mid seam 46. By placement of the hinges 50 on the inside surface of the ring 40 (FIG. 7), the mid seam 46 expands to a maximum amount when pivoted to the position shown in FIG. 7. However, the halves can be collapsed (about arrow D of FIG. 7) to have a smaller form, such as for fitting into a manhole cover C opening.

The halves 42, 44 can be connected together to form the ring 40 by utilizing clasp subassemblies 60 (FIGS. 7-10). Motion along arrow H causes the halves 42, 44 to be brought together at their mutual edges 48. This clasp subassembly 60 includes a bore sleeve 62 with a lateral hole 64 therein and a post 66 with a button 68 on the lateral side thereof. The post 66 is mounted to one of the halves 42, 44 and the bore sleeve 62 is formed on the other of the halves 44, 42. The post 66 is sized to translate into the bore sleeve 62, and the button 68 can snap into the lateral hole 64 when the post 66 is fully inserted into the bore sleeve 62 (along arrow H). The button 68 is biased toward an outer position, but can be flexed inwardly (along arrow I). The button 68 can be pushed to release the bore sleeve 62 from the button 68 and post 66, so that the halves 42, 44 can be separated and the ring 60 can be collapsed, when desired, such as after utilization of the bridge assembly 10. Other forms of collapsibility for the ring 40 could alternatively be utilized, such as a series of hinges, or multiple clasp subassemblies, or with a rigid ring 40 which is not collapsible, or two rigid halves which don't further collapse. A rigid ring 40 which is not collapsible would typically be permanently mounted to one of the ends 12, 14 of the bridge assembly 10 and inboard of the bladder 30.

At least one spreader bar 70 (FIGS. 3-6), and preferably multiple spreader bars 70, are optionally but preferably placed between each cuff 20 to maintain spacing between the rings 40 and between the cuffs 20, so that a length of the bridge assembly 10 cannot be contracted to a lesser length. Also, the spreader bars 70 keep the plugs (e.g. the cuffs 20 and bladders 30 and rings 40) at the ends of the bridge assembly 10 square relative to the sleeve 15 and with the bladders 30 expanding perpendicular to the long central axis of the sleeve 15. This makes installation easier and makes the bladders 30 far less likely to become dislodged or allowed to turn in the pipe, causing loss of containment.

Each spreader bar 70 includes an elongate body 72 with a pair of end plates 76 at each end of the elongate body 72. These end plates 76 are preferably parallel to each other and spaced apart by slots 74 having a width similar to a thickness of material forming the ring 40. With such slots 74 at each end of each spreader bar 70, spreader bars 70 can be utilized with the rings 40 residing within the slots 74 and the spreader bars 70 generally parallel with a central axis of the bridge assembly 10 to keep the rings 40, and hence also the cuffs 20, spaced from each other. Other forms of spreaders could alternatively be utilized including screw jack type structures or rigid members with adjustable clasps which can engage with corresponding clasp structures on the rings 40.

With particular reference to FIGS. 2, 10 and 16, details of the sleeve support trolley 80, as a preferred form of sleeve 15, are described according to an exemplary embodiment. In various embodiments, the sleeve 15 might not be sufficiently strong to carry the gravity loads associated with fluids after passing through the sleeve 15, especially in high flow rate conditions where large amounts of liquid Q (FIG. 2) are contained within the sleeve 15. To resist such sagging under gravity loads, at least one sleeve support trolley 80 can be provided under the sleeve 15 (FIGS. 2, 6 and 10). In this embodiment, the trolley 80 is foldable to transition between a collapsed size and a deployed size. A saddle 82 is provided which is generally semi-cylindrical. A pair of flaps 84 are hinged about hinges 86 on each straight edge of this saddle 82, so that when the flaps 84 are deployed (opposite arrow S of FIG. 10) the saddle 82 can be enlarged in size. However, the flaps 84 can be collapsed toward each other (along arrow S) to decrease the size of the saddle 82 of the trolley 80.

A leg 90 extends downwardly from the saddle 82 down to a foot 95. Preferably this leg 90 includes an upper shaft 92 and threaded shaft 94 which telescope relative to each other. A nut 96 is interposed therebetween, which threads upon the threaded shaft 94. This nut 96 can be free floating or fixed to the upper shaft 92. Nut 96 rotation will cause the nut 96 to translate along the threaded shaft 94 and modify a distance between the foot 95 and the saddle 82. In this way, the trolley 80 can have its height adjusted. The foot 95 rests upon a floor F, such as within a bottom of a manhole M and provides a surface upon which the foot 95 can rest and over which the trolley 80 can be placed. With appropriate adjustability, sleeve 15 is supported by the saddle 82 of the trolley 80 and prevented from undesirably great amounts of sagging.

Figure 11:
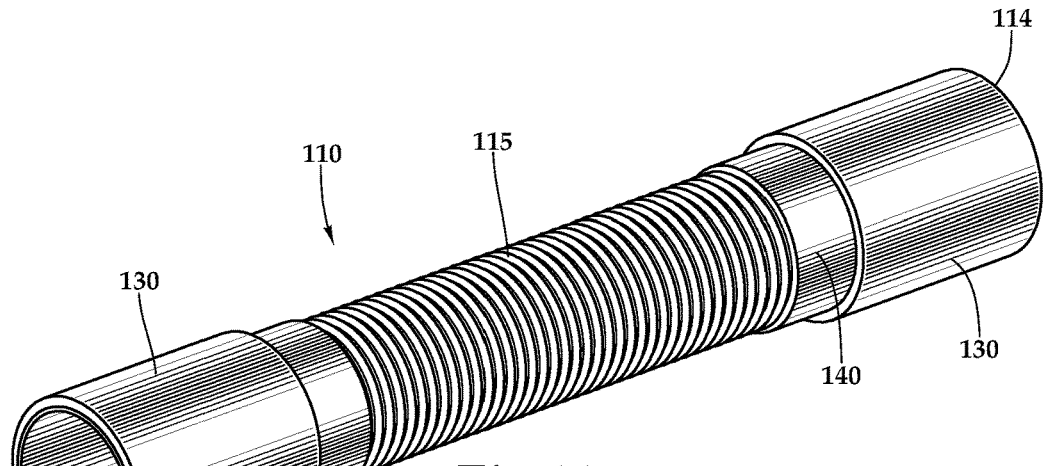
FIG. 11 is a perspective view of an alternative bridge assembly with non-collapsible rings adjacent to the ends thereof and with a flexible sleeve between the ends, the bladders shown deflated.
Figure 12:
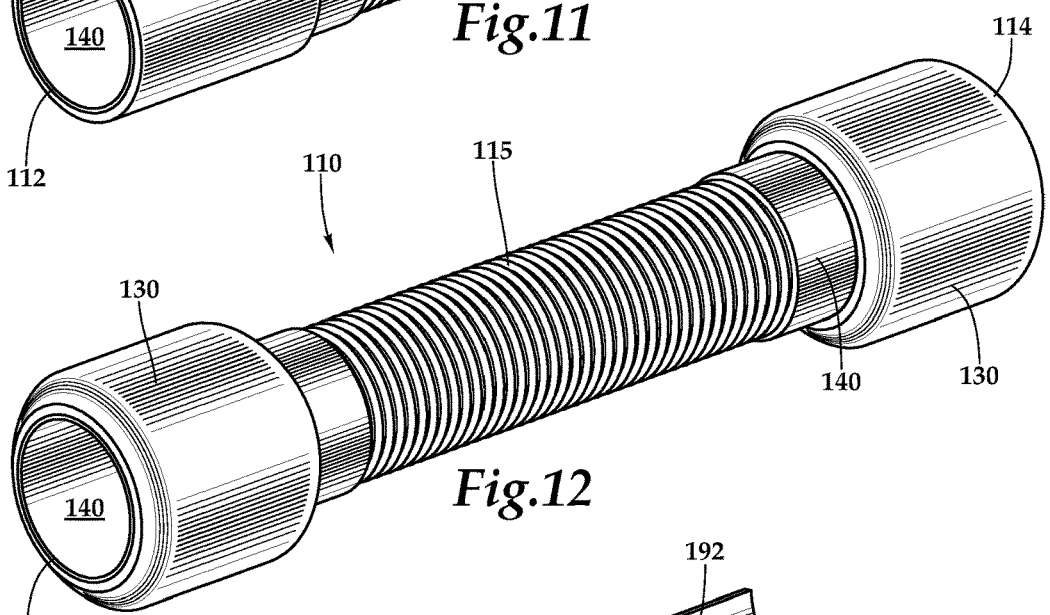
FIG. 12 is a perspective view of that which is shown in FIG. 11, but with the bladders inflated.
Figure 13:
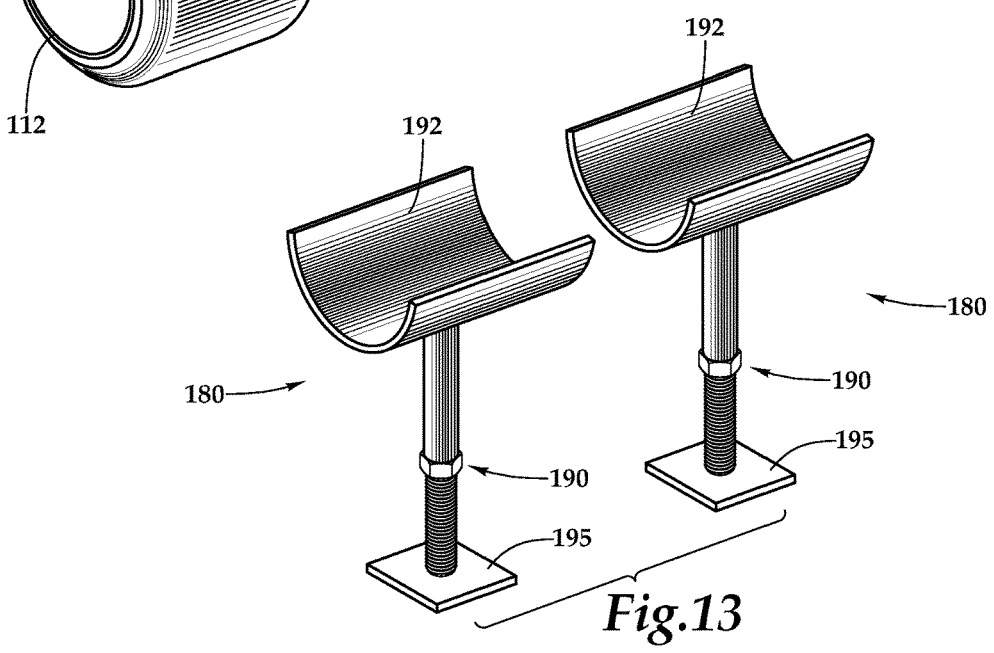
FIG. 13 is a perspective view of a pair of alternate sleeve supports, such as for use with the alternative bypass bridge assembly of FIGS. 11 and 12.

With particular reference to FIGS. 11-13, details of an alternative bridge assembly 110 are described. The alternative bridge assembly 110 includes a flexible conduit/sleeve 115 extending between an entry end 112 and an exit end 114. While the sleeve 115 is shown generally linear, it could be bent, such is about a 90° bend in the pipe P, so that the centerline of the sleeve 115 has a bend therein. Also in this embodiment, a fixed ring 140 is provided which is generally not collapsible, and supporting the bladder 130 in a manner which allows the bladder 130 to be radially expanded outwardly. This fixed ring 140 is typically permanently attached to the ends 112, 114 of the alternative bridge assembly 110.

Alternative support trolleys 180 are also shown which are of a non-folding variety. A leg 190 of adjustable for extends down to a foot 195. The alternate saddle 192 is a one piece saddle 192 without any flaps on lateral edges thereof. The alternative support trolley 180 works in a manner similar to the support trolley 80 described above.

In use and operation, and with particular reference to FIGS. 2, 3 and 6, details of the operation of the bridge assembly 10 are described, according to a typical embodiment, and which method of use is also applicable to other embodiments including the alternative bridge assembly 110. Initially, the maintenance area is identified which is to have liquid Q bypass this area. In FIG. 2, this area is indicated as a manhole M which requires rehabilitation.

Before placement of the bridge assembly 10, typically an upstream location has a plug placed therein and the pipe P is plugged temporarily while the bridge 10 is put in place. Alternatively, the bridge 10 could be put in place buy careful placement into a pipe P which is filled with liquid Q. Just upstream of this manhole M, the entry end 12 of the bridge assembly 10 is placed, with the exit end 14 of the bridge assembly 10 located downstream of this manhole M requiring rehabilitation. A ring 40 is broken into separate subparts (FIG. 7) passed through the hole in the manhole M (with the cover C removed) and slid into each cuff 20 after placement onto an outer surface of the sleeve 15 and coupled together at clasp subassemblies 60.

Once the bridge assembly 10 has been placed where desired and the rings 40 installed, the bladders 30 are filled, such as with compressed air (or liquid), and expanded outwardly (along arrow J in FIG. 3). If desired, the spreader bars 70 can be placed between the rings 40 to maintain length of the bridge assembly 10. Any temporary plug placed upstream of the maintenance area can then be deflated and removed. Fluid Q can then follow up to the bridge assembly 10 and pass through the sleeve 15 of the bridge assembly 10, bypassing the maintenance area.

If excessive sag of the sleeve 15 is encountered (or anticipated), at least one sleeve support trolley 80 can be deployed beneath the sleeve 15, and adjusted in height (FIG. 10), and with flaps deployed (opposite arrow S) for optimal supporting of the sleeve 15. Residual liquid beneath the bridge assembly 10 can be pumped out if required. Maintenance is then performed in the maintenance area. When maintenance is complete, the above described procedure is reversed for disassembly, deflation and removal of the bridge assembly 10. Such removal typically occurs after first placing a pipe plug upstream of the bridge assembly 10 to temporarily close off flow for bridge assembly 10 removal. After bridge assembly 10 has been removed, this upstream plug can be finally removed. The maintenance procedure is thus complete, and no interference with roadways adjacent to the pipe P and above ground G are interfered with, and no pumps are required to keep the fluid Q flowing through the maintenance area.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, while the bridge assembly 10 is shown with two ends 12, 14 it could have three (or more) ends to function at a junction of a pipe P. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A bypass bridge for a fluid handling line, the bypass bridge comprising in combination:
    a sleeve extending between an upstream end and a downstream end;
    a cuff on each of said ends with an inner layer and an outer layer;
    a rigid ring located between said inner layer and said outer layer of each said cuff; and
    a bladder located on an outer portion of each said cuff, said bladders inflatable to expand between said ring and a surface of the fluid handling line in which said ends of said sleeve are located.

2. The bypass bridge of claim 1 wherein at least one of said rings is collapsible into separate ring portions which, when coupled together form said ring into a continuous substantially rigid structure.

3. The bypass bridge of claim 2 wherein said collapsible ring includes four separate ring components including first and second ring components which are hinged together and third and fourth ring components which are hinged together, and with said first and second ring components removably attachable to said third and fourth ring components to form a complete circuit of said substantially rigid structure.

4. The bypass bridge of claim 1 wherein at least one spreader is located between one of said rings in said cuff adjacent to said upstream end of the bridge and one of said rings in said cuff adjacent to said downstream end of the bridge, said spreader bar maintaining a distance between said rings.

5. The bridge of claim 4 wherein said spreader includes an elongate body with a slot at each end thereof, said slot sized to straddle portions of said rigid ring closest to each other.

6. The bypass bridge of claim 1 wherein at least one sleeve support is located beneath a portion of said sleeve and supporting at least a portion of said sleeve to reduce sagging downward when carrying weight loads of fluids passing through said sleeve.

7. The bridge of claim 6 wherein said sleeve support includes a saddle above an elongate leg, said saddle sized to support a portion of said sleeve above said saddle.

8. The bridge of claim 7 wherein said leg is extendable in length, such that said saddle can be elevated and/or lowered by extension of said leg.

9. The bridge of claim 8 wherein said saddle is semi-cylindrical in form and includes a pair of flaps at opposing straight edges thereof which pivot by hinges to a central portion of said saddle, such that said saddle can be enlarged by unfolding of said flaps.

10. A bypass bridge for a fluid handling line, the bypass bridge comprising in combination:
- a sleeve extending between an upstream end and a downstream end;
- a rigid ring located adjacent to each said end;
- a bladder located radially outboard of each said ring, said bladder inflatable to expand between said ring and a surface of the fluid handling line in which said sleeve is located; and
- wherein said ends of said sleeve include cuffs thereon, each of said rigid rings located at least partially within one of said cuffs.

11. A bypass bridge for a fluid handling line, the bypass bridge comprising in combination:
- a sleeve extending between an upstream end and a downstream end;
- a rigid ring located adjacent to each said end;
- a bladder located radially outboard of each said ring, said bladder inflatable to expand between said ring and a surface of the fluid handling line in which said sleeve is located; and
- wherein at least one of said rings is collapsible into separate ring portions which, when coupled together form said ring into a continuous substantially rigid structure.

12. The bypass bridge of claim 11 wherein said collapsible ring includes four separate ring components including first and second ring components which are hinged together to form a first half of said ring and third and fourth ring components which are hinged together to form a second half of said ring, and with said first and second ring components removably attachable to said third and fourth ring components to form a complete circuit of said substantially rigid structure.

13. The bypass bridge of claim 12 wherein the first half and the second half of said ring each including two of said ring components hinged together and having edges supporting at least one clasp for connecting to the other of said halves, each said clasp including a post fitting within a bore, with a lateral hole in the bore and with a button on said post positioned and sized to fit through said lateral hole to retain said post of said clasp within said bore of said clasp.

14. The bypass bridge of claim 12 wherein said hinge includes a pintle on an inside of each of said halves formed of two of said ring components, such that said two ring components pivot together about said hinge with said pintle between said ring components, and said ring components abutting each other and resisting further pivoting when said ring components are fully pivoted away from each other about said pintle.

15. A bypass bridge for a fluid handling line, the bypass bridge comprising in combination:
- a sleeve extending between an upstream end and a downstream end;
- a rigid ring located adjacent to each said end;
- a bladder located radially outboard of each said ring, said bladder inflatable to expand between said ring and a surface of the fluid handling line in which said sleeve is located; and
- wherein at least one spreader bar is located between one of said rings in said cuff adjacent to said upstream end of the bridge and one of said rings in said cuff adjacent to said downstream end of the bridge, said spreader bar maintaining a distance between said rings.

16. The bypass bridge of claim 15 wherein said spreader bar includes an elongate body with a slot at each end thereof, said slot sized to straddle portions of said rigid ring closest to each other.

17. A bypass bridge for a fluid handling line, the bypass bridge comprising in combination:
- a sleeve extending between an upstream end and a downstream end;
- a rigid ring located adjacent to each said end;
- a bladder located radially outboard of each said ring, said bladder inflatable to expand between said ring and a surface of the fluid handling line in which said sleeve is located; and
- wherein at least one sleeve support is located beneath a portion of said sleeve and supporting at least a portion of said sleeve to reduce sagging downward when carrying weight loads of fluids passing through said sleeve.

18. A method for bypassing a fluid transport line between an upstream location and a downstream location on either side of a maintenance location, the method including the steps of:
- placing a bypass bridge extending through the line between the upstream location and the downstream location on either side of the maintenance location, the bypass bridge including a sleeve extending between an upstream end and a downstream end;
- a rigid ring located adjacent to each end of the sleeve;
- a bladder located radially outboard of each of the rings, the bladder inflatable to expand between the ring and a surface of the fluid handling line in which the sleeve is located;
- inflating at least the bladder adjacent to the upstream end of the bypass bridge; and
- supporting at least a portion of the support sleeve from gravity loads by placing at least one sleeve support beneath a portion of the sleeve and supporting at least a portion of the sleeve from sagging downward at least partially due to weight loads carried by the sleeve when fluids pass therethrough.

* * * * *